United States Patent [19]

Troy et al.

[11] Patent Number: 5,314,152

[45] Date of Patent: May 24, 1994

[54] NESTABLE, STACKABLE PRINTER SUPPORT STAND

[75] Inventors: Gary J. Troy, Nottingham; Edward L. Hames, Peterborough, both of N.H.

[73] Assignee: Curtis Manufacturing Company, Inc., Jaffrey, N.H.

[21] Appl. No.: 910,826

[22] Filed: Jul. 6, 1992

Related U.S. Application Data

[63] Continuation-in-part of Ser. No. 847,819, Mar. 9, 1992.

[51] Int. Cl.⁵ .............................................. A47G 23/02
[52] U.S. Cl. ..................................... 248/146; 248/676; 248/918; 206/821; 211/13; 211/194
[58] Field of Search ............ 248/146, 150, 151, 188.2, 248/188.8, 670, 917, 918, 924, 201, 676, 677, 678, 675, 639, 637; 211/194, 26, 13; 206/821 X; 182/178

[56] References Cited

U.S. PATENT DOCUMENTS

| | | | |
|---|---|---|---|
| D. 290,717 | 7/1987 | Judd . | |
| 2,344,804 | 3/1944 | Crosby | 211/49.1 X |
| 2,893,164 | 7/1959 | Martin | 248/188.2 |
| 3,650,501 | 3/1972 | Streb | 248/146 |
| 4,099,627 | 7/1978 | Strada | 211/194 |
| 4,394,563 | 7/1983 | Schnell | 248/188.8 X |
| 4,703,919 | 11/1987 | Drake et al. | 248/677 |
| 4,925,137 | 5/1990 | Hastings | 248/188.2 X |
| 4,938,447 | 7/1990 | Schriner . | |
| 5,040,766 | 8/1991 | Egly et al. | 211/13 X |
| 5,078,278 | 1/1992 | Edmark | 211/194 X |
| 5,169,360 | 12/1992 | Saunders | 248/188.2 X |

*Primary Examiner*—David A. Scherbel
*Assistant Examiner*—Korie H. Chan
*Attorney, Agent, or Firm*—Richard P. Crowley

[57] ABSTRACT

A printer-support stand which comprises a pair of first and second support legs adapted to be placed in a spaced-apart relationship to provide a printer-support stand. Each leg is comprised of an integrally molded plastic material, and comprises upward front and back sections, a base element extending between the front and back leg sections and characterized by an elongated, internal open space, and an elongated support-bar element having a generally flat top surface extending between the front and back sections, to provide an upper support surface for the printer. Each of the legs is characterized by an open internal space which mimics the shape of the leg, so that the first and second support legs may be stacked nestably within each other for convenience in shipping and displaying, with the support-stand element within the internal open space of the base in the nestable, stacked condition.

11 Claims, 3 Drawing Sheets

# NESTABLE, STACKABLE PRINTER SUPPORT STAND

REFERENCE TO PRIOR APPLICATION

This application is a continuation-in-part of U.S. patent application Ser. No. 847,819, filed Mar. 9, 1992, which application is hereby incorporated in its entirety in this application.

BACKGROUND OF THE INVENTION

There is a wide variety of support stands, particularly to provide support for printers and other computer and office-type equipment. Typical printer stands comprise a pair of spaced-apart legs, with the printer adapted to be placed on the upper surface of the spaced-apart support legs. The support legs may be adjusted to fit the desired width of the printer, and usually provide for a space beneath the printer to store paper. Optionally, the upper surface of such printer stands may be equipped with a friction-type tape or antislip surface, particularly where the upper surface of the printer stand is tapered, so as to provide for a firm, nonslip arrangement of the printer on the support stand. Such support stands, comprising a pair of spaced-apart support legs, also may be employed in conjunction with a paper-tray receiver or other means, typically placed or attached in the back of the support stand, to receive paper generated from the supported printer.

A printer-support stand, comprising a pair of support legs, is shown, for example, in U.S. Pat. No. Des. 290,717, issued Jul. 7, 1987. In addition, adjustable printer support legs, used in conjunction with an adjustable paper a stand for a paper-discharging device, are illustrated in U.S. Pat. No. 4,938,447, issued Jul. 3, 1990.

It is desirable to provide for a new and improved support stand, particularly a printer-support stand composed of a pair of support legs, which is easily and inexpensively manufactured and structured to be conveniently shipped and displayed.

SUMMARY OF THE INVENTION

The invention relates to a nestable, stackable, printer-support stand and method, and more particularly to support legs which may be stacked nestably in pairs with other support legs, for convenience in shipping, packing and displaying and for saving space.

The present invention concerns a support stand for a printer or other apparatus required to be supported on a support stand, and which support stand comprises first and second support legs, which legs are adapted to be placed in a spaced-apart relationship, to provide a support stand on the upper surface. Preferably, each of the support legs is composed of an integrally molded plastic material; for example, constructed of a rugged, high-impact, plastic material for long life, and which also contains nonmarring, antiskid feet on the base thereof, to reduce noise and vibration. Typically the support legs are used in pairs, although additional legs may be used as required, to support the printer or other apparatus and provide a space beneath the printer for the storage of paper. The support legs may be used in conjunction with a removable, adjustable paper receiver or tray in the rear of the support legs, to receive paper from the supported printer.

The support legs used in the support stand comprise generally hollow, upwardly tapered, front and back sections, which sections have a top and a bottom, and a base element extending between the bottom of the front and back sections. The base element is characterized by an elongated, internal open space between the front and back sections. The legs also include an elongated support-stand or bar element having a generally flat top surface which extends between the top of the front and back sections, to provide an upper support surface for each leg. The support legs are characterized in that the legs are hollow, with an internal space which mimics substantially the external structure, to permit nesting and stacking of the support legs. The support legs are characterized, so that the first and second support legs may be stacked nestably, one within each other, for convenience in shipping, packaging and displaying and for saving space. In the nested, stacked condition, typically first and second support legs are placed together, with the elongated support-stand element of one of the support legs extending through the internal open space of the upper support legs, and generally with the front and back sections hollow and with upwardly, inwardly tapered sides, so that, in the nested condition, the back and front sections are in a close, nesting relationship.

In use, the support legs may be placed in a spaced-apart, generally aligned, parallel arrangement, depending upon the width of the apparatus to be supported. The printer or other apparatus is placed on the upper flat surface of the support legs. Optionally, as desired, the first support legs may contain nonmarring, antiskid feet on the lower level of the base element, and optionally also may contain an antifriction surface integrally molded into the upper flat surface of the support element, or by the employment of an antifriction tape or rubber or elastomeric strip placed on the flat surface, to prevent movement of the printer in the supported position.

In the nested and stacked position, the first and second support legs may be placed in a stacked arrangement and then a leg-pair retaining means employed, to retain together the first and second support legs, which retaining means is easily removed by the user, so that the first and second legs are always placed together and conveniently removed from the stacked relationship by a purchaser. For example, the retaining means may comprise a paper wrapper which may optionally include advertisements, directions or other logo or printed instructions and indicia on the paper surface, and which paper wrapper typically would wrap around the elongated support or bar elements of the first and second support legs in the nested, stacked condition. Further, the support elements may be stacked together in a plurality of retained, stacked pairs, which provides convenience both in shipping and displaying, and eliminates the need to package separately each pair of support legs, so that, in the plurality of stacked, nested pairs of support legs, the user may conveniently sequentially remove each upper pair of support legs from the stacked arrangement.

The invention includes a method of shipping and displaying a plurality of pairs of support legs which includes providing a pair of support legs, typically retained together, and stacking one identical leg within the other, and then stacking a plurality of pairs of first and second legs in a generally upright, stacked, nested arrangement for convenience in shipping and displaying.

The invention will be described for the purposes of illustration only, in connection with certain embodiments; however, it is recognized that those persons skilled in the art may make various modifications, changes, additions and improvements to the illustrated embodiments, without departing from the spirit and scope of the invention.

DESCRIPTION OF THE EMBODIMENTS

Figure 1:
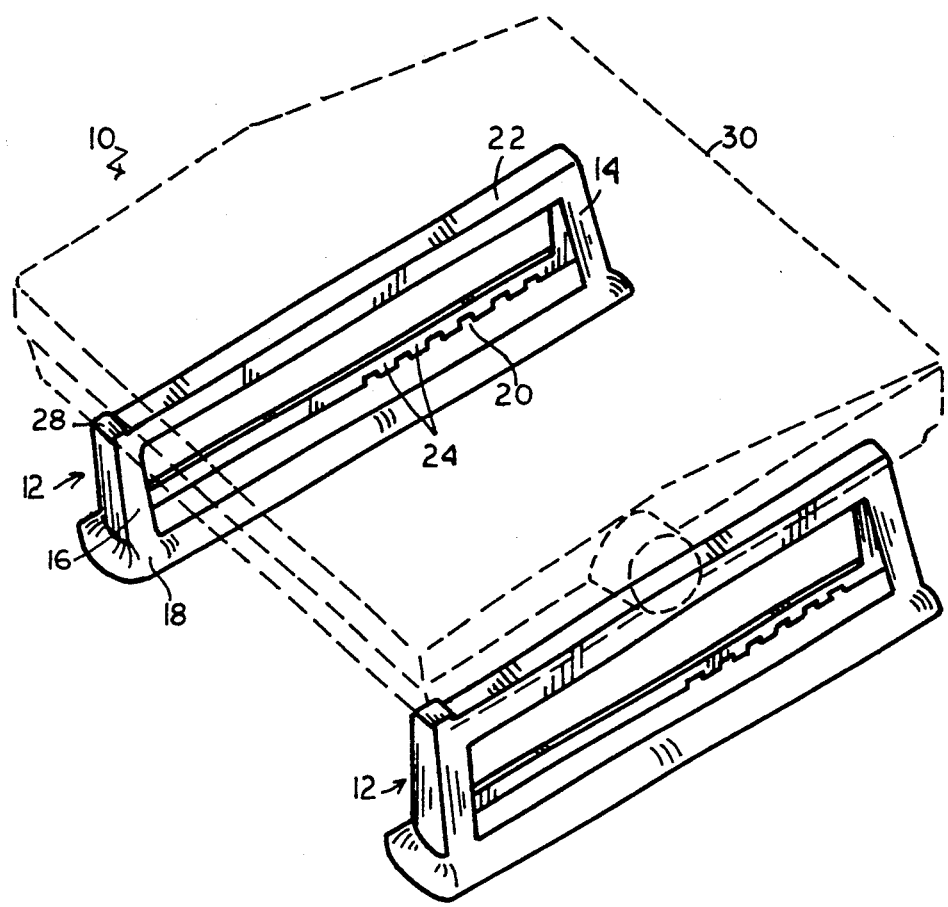
FIG. 1 is a perspective view from above of the support stand of the invention, showing a support stand supporting a printer shown in dotted lines.
Figure 2:
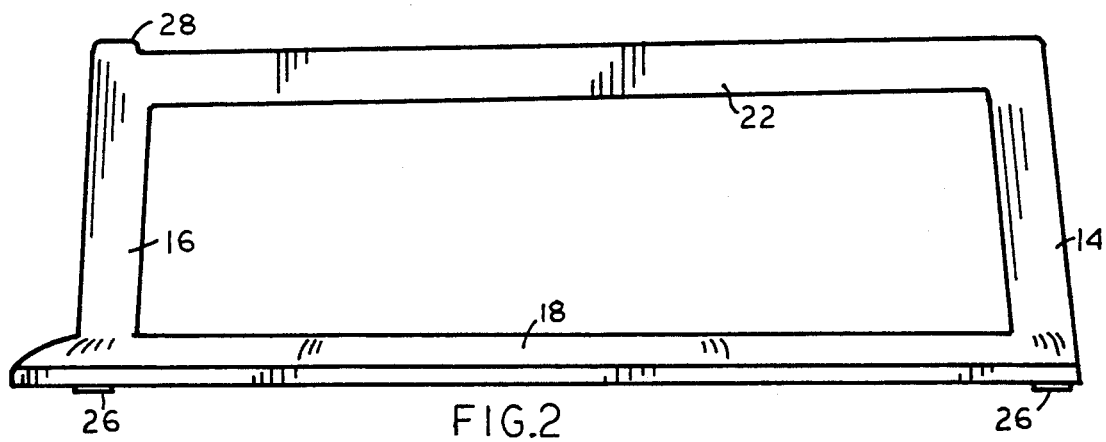
FIG. 2 is a side plan view of the support leg of the support stand.
Figure 3:
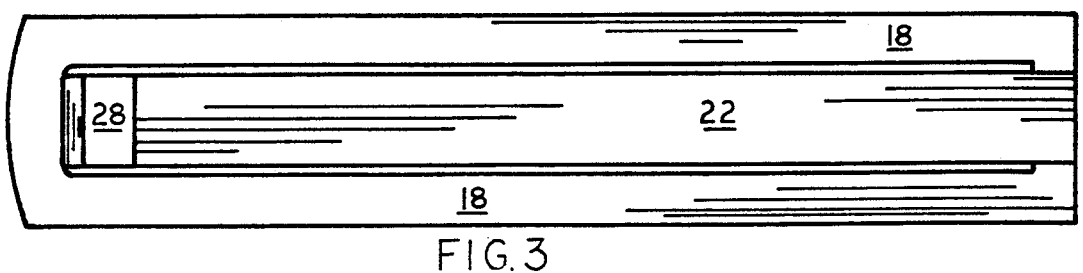
FIG. 3 is a top plan view of the support leg of the support stand.
Figure 4:
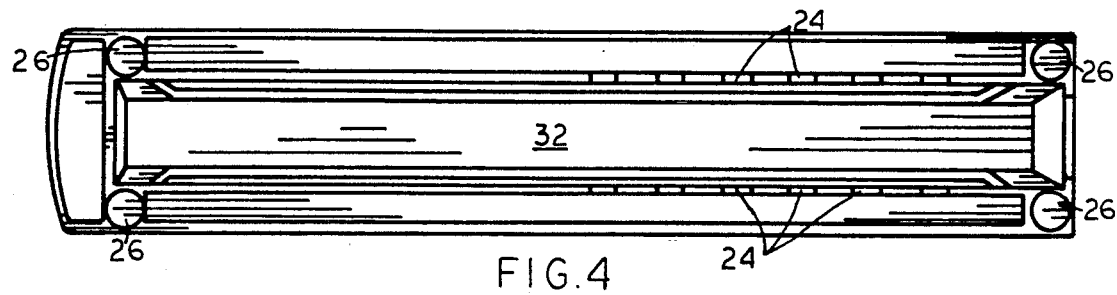
FIG. 4 is a bottom plan view of the support leg of the support stand.
Figure 5:
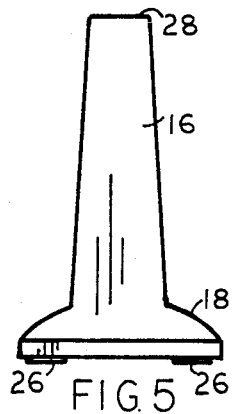
FIG. 5 is a front plan view of the support leg of the support stand.

With particular reference to FIGS. 1-6, there is shown a printer-support system 10 which shows an illustration of a printer 30, in dotted lines, supported on a pair of spaced-apart support legs 12, which support legs are integrally molded of a hard, injection-molded-type plastic, such as ABS resin. Each leg 12 comprises a back section 14, a front section 16 and an elongated base 18 connecting the front and back sections and defining an elongated, open, internal space 20. The upper portion of the support legs 12 includes an elongated support stand or bar 22 which has a generally flat surface, and optionally may contain an antiskid surface or an antiskid tape thereon. The support surface may, for example, be generally parallel to the ground, as illustrated, or may have a slight forward incline or tapered as desired. The leg 12 includes in its base 18 a plurality of teeth 24 on either side toward the back end of the support leg 12, which teeth are designed to receive support and spacer elements (not shown), such as, for example, support and spacer elements used in connection with U.S. Pat. No. 4,938,447, for the securing together of the legs 12 in a particular spaced-apart, defined-width position, or to define the position of a paper catcher on the rear side of the support legs. The support element 22 includes on the front a raised indent 26 which serves as a stop means for the printer 30. The legs also include resilient antiskid feet 26, to stabilize the support legs and prevent movement thereof on the support surface, such as a desk. The support legs 12 include a hollow, internal space 32 which defines and mimics an interior contoured space similar to the external structure of the legs.

Figure 6:
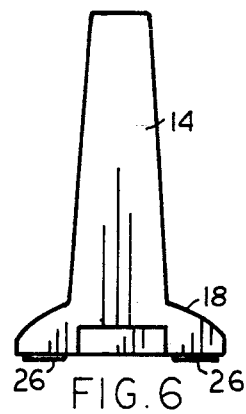
FIG. 6 is a back plan view of the support leg of the support stand.
Figure 7:
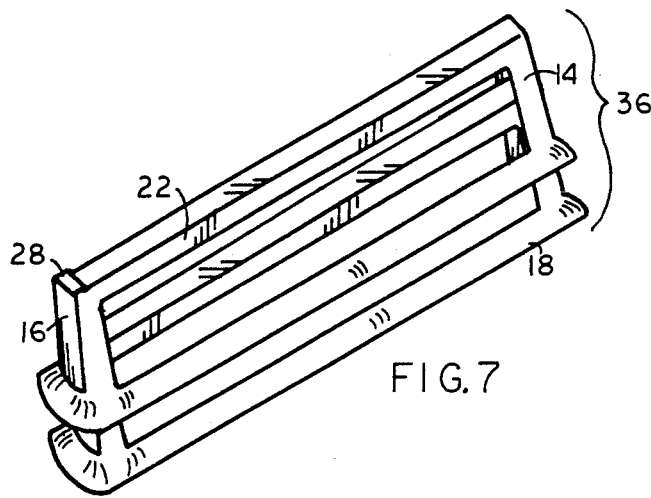
FIG. 7 is a perspective view from above of a pair of retained support legs in a stacked, nested relationship.

With particular reference to FIGS. 6 and 7, there is shown in FIG. 6 a pair of support legs 12 in a nested, stacked relationship 36, wherein the support bars 22 of the support legs are retained together as a pair of support legs 12 with a paper wrapper 34, so that a user or purchaser will be provided with a pair of legs to support the printer 30. The wrapper or retaining means 34 is typically, for example, of paper, and which may include the name of the operating instructions, a logo or indicia or other printed information relative to the support legs and system. The wrapper 34 is tightly wrapped about both bars in the stacked legs 12, so as not to prevent the stacking together of the legs. It should be noted that the legs stacked together provide for a reduction in total height of the second stacked leg on the first leg over 50% to 70% of the legs, and thus effect savings in both the shipping and displaying of the pair of support legs 12, and obviate the need for separate container-type packages. As illustrated in FIG. 6, the lower leg 12 fits within the internal space 32 of the upper leg 12, and the support bar 22 of the lower leg 12 fits through the internal space 20 in the base of the upper leg, while the front 16 and back 14 sections, which are tapered on their sides slightly upwardly, are fit in a nesting, tapering, contacting relationship, to provide a compact, nested, stacked relationship for the pair of support legs 12.

Figure 8:
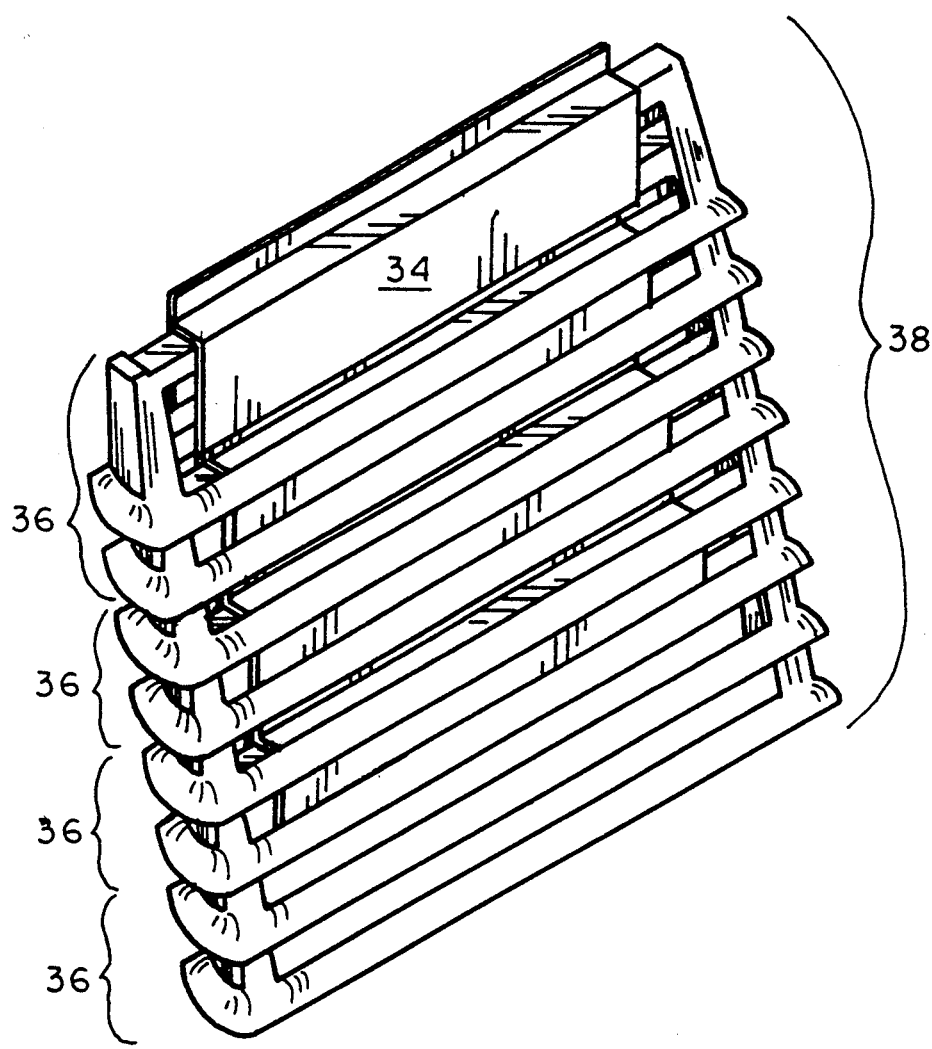
FIG. 8 is a perspective view from above of a plurality of pairs of support legs of FIG. 7 in a stacked, nested relationship.

FIG. 8 is an illustration of a plurality of pairs of support legs 12 of FIG. 7, with each pair of support legs 36 in a nested, stacked arrangement with four support legs as illustrated, with the wrapper 34 between each pair of legs 12. FIG. 8 illustrates the display of the printer stand, for example, at the point-of-purchase position, wherein the top pair of support legs may be moved by a user, the wrapper removed, and the support legs then used to support a printer 30.

The support stand and system as thus illustrated provide for unique, integrally molded, effective support legs for a printer or other equipment, and wherein the support legs may be nested and stacked together in pairs and a plurality of pairs, for convenience in shipping and displaying.

What is claimed is:

1. A support stand for a printer or other apparatus to be supported, which support stand comprises first and second support legs adapted to be placed in a spaced-apart relationship to provide a support stand, each leg formed of integrally molded plastic material having:

a) generally hollow, upwardly extended, tapered front and back sections, each section having a top and a bottom;

b) a base element extending between the front and back sections at the bottom thereof and characterized by an elongated, internal, open space between the front and back sections, the open space of sufficient dimensions to receive therein an elongated support stand element of another identical support stand leg;

c) an elongated support-stand element having a generally flat top surface and extending between the top of the front and back sections, to provide an upper support surface for each leg;

d) each leg characterized by having an open internal space which mimics substantially the external structure, with the first and second support legs nested and stacked within each other, for convenience in shipping and displaying, with the lower leg extending within the internal open space of the base of the upper leg, and the front and back sections in a close, nested, stacked relationship to effect a reduction in total height in the stacked pair of legs; and e) a removable retaining means about the pair of the support stand elements of the nested and stacked pair of first and second legs to retain together the first and second nested and stacked legs for display or shipping.

2. The stand of claim 1 wherein the base element extends about the periphery of the bottom front of the front section.

3. The stand of claim 1 wherein the base element comprises a pair of generally spaced-apart, parallel, side elements extending on either side of the front and back sections.

4. The stand of claim 1 wherein the base element includes a plurality of spaced-apart teeth on the lower surface of the base element.

5. The stand of claim 1 which includes a raised stop means on the top of the support element above the front section.

6. A plurality of nested and stacked, first and second support-leg pairs of claim 1 in a nested, stacked position, with the support stand element of the upper support leg extending through the open space of the base of the next upward pair of first and second support legs.

7. The stand of claim 1 wherein the reduction in total height of the upper leg as stacked on the lower leg is over 50% of the height of the second leg.

8. The stand of claim 1 wherein the retaining means includes a paper-type wrapper means about the central periphery of the stand elements.

9. The stand of claim 8 wherein the paper-type wrapper means includes printed indicia thereon.

10. In combination a support stand for a printer or other apparatus to be supported, which support stand comprises first and second support legs, the legs adapted to be placed in use in a spaced-apart, generally parallel relationship to provide a support stand, each leg comprising integrally molded plastic material having:
 a) generally hollow, upwardly tapered front and back sections having a top and a bottom;
 b) a base element extending between the bottom of the front and back sections and characterized by an elongated, internal, open space between the front and back sections;
 c) an elongated support-stand element having a generally flat top surface as a supporting surface and extending between the top of the front and back sections;
 d) a raised stop means on the front section of the flat surface of the support-stand element, to retain the apparatus to be supported;
 e) each leg characterized by having an open internal space which mimics substantially the external structure of each leg;
 f) the first and second legs in a nested, stacked arrangement, with the first lower leg nested within the internal space of the upper second leg, and with the support-stand element of the lower legs extending through the internal space of the base of the upper legs to reduce the total height of the support legs; and
 g) sheet-type, wrapper-retaining means extending about the periphery of the elongated support-stand elements of the first and second legs, which wrapper-retaining means may be removed prior to use by a user.

11. In combination a plurality of nested, stacked pairs of support legs of claim 10.

* * * * *